(12) United States Patent  
Kliefoth

(10) Patent No.: US 9,212,002 B2
(45) Date of Patent: Dec. 15, 2015

(54) BELT CONVEYOR

(75) Inventor: Rüdiger Kliefoth, Ronnenberg (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 0 days.

(21) Appl. No.: 14/111,611

(22) PCT Filed: Apr. 25, 2012

(86) PCT No.: PCT/EP2012/057509
§ 371 (c)(1),
(2), (4) Date: Oct. 14, 2013

(87) PCT Pub. No.: WO2012/146593
PCT Pub. Date: Nov. 1, 2012

(65) Prior Publication Data
US 2014/0034457 A1    Feb. 6, 2014

(30) Foreign Application Priority Data

Apr. 29, 2011  (EP) .................................... 11164321

(51) Int. Cl.
*B65G 15/62* (2006.01)
*B65G 15/28* (2006.01)

(52) U.S. Cl.
CPC ................ *B65G 15/28* (2013.01); *B65G 15/62* (2013.01); *B65G 2201/042* (2013.01)

(58) Field of Classification Search
CPC .......... B65G 15/60; B65G 15/62; G03G 5/00; G03G 15/00
USPC .................... 198/835, 840, 836.1, 841, 860.1; 177/145, 119
See application file for complete search history.

(56) References Cited

U.S. PATENT DOCUMENTS

| | | | | |
|---|---|---|---|---|
| 3,561,553 A * | 2/1971 | Blubaugh | ...................... | 177/168 |
| 4,463,816 A * | 8/1984 | MacFarlane | .................. | 177/119 |
| 4,570,729 A * | 2/1986 | Del Rosso | ...................... | 177/145 |
| 5,164,777 A * | 11/1992 | Agarwal | ............. | G03G 15/755 |
| | | | | 198/814 |
| 5,670,752 A * | 9/1997 | Nakajima | ...................... | 177/145 |

(Continued)

FOREIGN PATENT DOCUMENTS

CN    1437017 A    8/2003
CN    1754794 A    4/2006

(Continued)

OTHER PUBLICATIONS

International Preliminary Report on Patentability (English transition), mailed Oct. 29, 2013.

*Primary Examiner* — James R Bidwell
(74) *Attorney, Agent, or Firm* — Standley Law Group LLP

(57) ABSTRACT

A belt conveyor (1) includes a conveyor bed (6) on which belt rollers (13, 14) are arranged, respectively, at both the leading end and the trailing end relative to the transport direction T, and it also includes a conveyor belt (5) which is arranged to be movable over the conveyor bed (6, 106) and around the belt rollers (13, 14). The conveyor belt (5) is arranged and pulled tight over the conveyor bed (6) and the belt rollers (13, 14) in such a way that a sealing effect is achieved between the outside borders (7) of the conveyor belt (5) and the conveyor bed (6), wherein the outside borders (7) of the conveyor belt (5) are set back from the edges (16) of the conveyor bed (6) by a distance (d) equal to at least the maximum sweep of a lateral variation in the movement of the conveyor belt.

14 Claims, 5 Drawing Sheets

(56) References Cited

U.S. PATENT DOCUMENTS

| | | | |
|---|---|---|---|
| 5,692,597 A * | 12/1997 | Ferguson | 198/841 |
| 5,747,747 A * | 5/1998 | Cadou et al. | 177/145 |
| 6,422,382 B1 * | 7/2002 | Ertel et al. | 198/860.1 |
| 6,509,533 B1 * | 1/2003 | Tanaka et al. | 177/126 |
| 6,695,124 B2 * | 2/2004 | Nixon | 198/588 |
| 6,708,813 B2 * | 3/2004 | Takahashi | 198/369.2 |
| 6,803,529 B2 | 10/2004 | Takahashi | |
| 6,958,452 B2 | 10/2005 | Takahashi | |
| 7,107,004 B2 | 9/2006 | Saito | |
| 8,335,461 B2 | 12/2012 | Yasumoto | |
| 2004/0084287 A1 * | 5/2004 | Nesdahl | 198/841 |

FOREIGN PATENT DOCUMENTS

| | | |
|---|---|---|
| CN | 101837882 A | 9/2010 |
| DE | 10 2006 048 251 A1 | 4/2008 |
| SU | 1461708 A1 | 2/1989 |

* cited by examiner

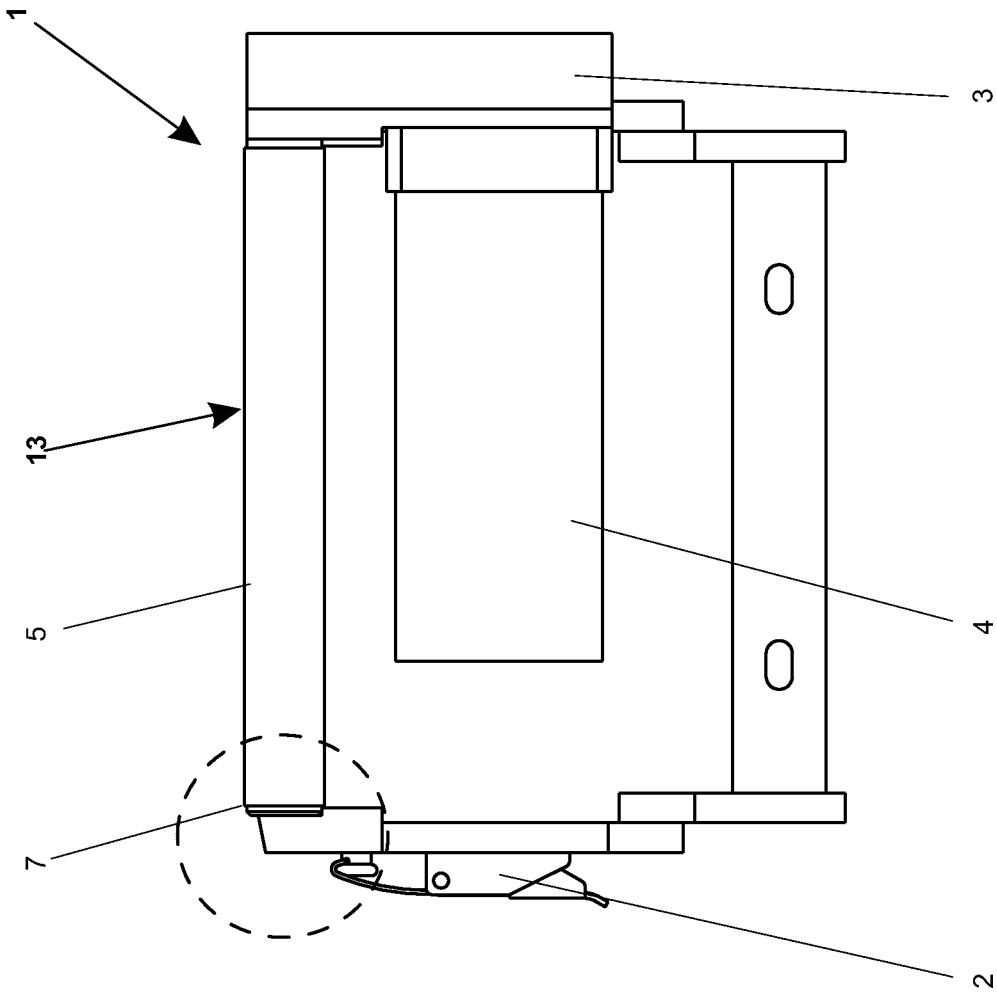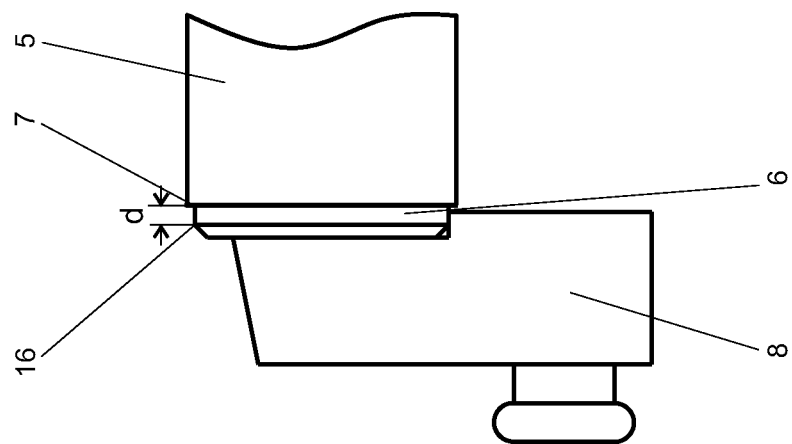
FIG. 3
FIG. 3a

BELT CONVEYOR

TECHNICAL FIELD

The present invention concerns a conveyor device, in particular a belt conveyor with a conveyor bed on which belt rollers are arranged at each of the ends facing, respectively, in the transport direction and against the transport direction and wherein the conveyor device includes a belt that is arranged to be movable over the conveyor bed and around the belt rollers.

BACKGROUND

A preferred use for equipment of this type for transporting goods or products occurs in situations where goods have to be brought to an inspection apparatus for their examination. This can be a weighing system for the dynamic weighing of the goods passing over it, or a device for the detection of metallic contaminants in products, or an X-ray apparatus for the detection of different types of foreign matter in products, as well as other inspection equipment. Preferred applications are for products in the form of prepackaged goods in the food industry or in the pharmaceutical industry, particularly powdered or fine-grained prepackaged products.

A belt conveyor within this context can be, for example, an infeed conveyor, an outfeed conveyor, or a weighing conveyor for in-motion weighing on a dynamic weighing device. Likewise, belt conveyors for transporting products through an inspection system for the detection of contaminants are to be considered within the present context. A conveyor belt is in many cases configured as a so-called endless belt, meaning a belt that forms a closed loop, which runs around at least two belt rollers, specifically a passive idling roller and a driven roller which is connected to a drive mechanism which actively drives the movement of the belt.

As an example for the goods or products to be transported, packages containing powdered or granular substances should be mentioned here, with sugar being of particular interest. Sugar that is to be sold in retail stores is packaged in units of a predefined weight, for example 1 kg, preferably in paper packages. These paper packages are normally folded paper bags which are glued at the closure seams and which firmly encase the contents as a package. As is known from experience, these paper packages are not completely leak-proof, and in the course of transportation it has to be expected that granules of sugar may escape in some small amounts from the paper packages at any time and remain lying on the transport conveyor. However, such granules of sugar lying loosely on a conveyor belt can cause enormous damage, if they enter between the movable parts of the belt conveyor mechanism.

Powder or fine-grained material lying on the conveyor belt creates the problem that these materials are easily spread around by the rapid movement of the conveyor belt and can thus also get under the belt, for example onto the inside of the endless loop, where they are ground up, and that they can end up entering into the bearings of the conveyor rollers that are located at the ends of the belt conveyor. There, they can cause serious damage as they heat up, become compacted and clogged together, and as a result the affected components of the belt conveyor will have to be exchanged frequently.

Due to the open construction of the belt conveyors of the known state of the art, there is furthermore the risk that the material lying on the belt could get into the drive mechanism. This danger exists in particular in the case of a belt drive which normally includes a belt running over two pulleys, such as a toothed belt, a V-belt and the like. The powder or fine-grained material can be carried from the belt to the pulleys, where it can become compacted and form a deposit. This leads to an accumulation of material at the circumference of the pulley and as a consequence, an increase in belt tension, whereby the belt is stretched to the point where it will ultimately break. The failure of a belt and especially the time needed to replace it also means unproductive downtime for the entire system involved.

According to state-of-the-art solutions that aim to counter this problem, the packages are in many cases transported on a multi-strap conveyor instead of a belt conveyor, wherein a catch basin is arranged below the conveyor straps to collect the material leaking out of the packages. However, this arrangement still does not ensure that the for the most part openly exposed bearings will not be reached by the escaped material. There is further the danger, particularly at high operating speeds, that vibrations of the straps could disturb the smooth running of the conveyor, a condition that will manifest itself through an inaccuracy of the measurements, for example in the dynamic weighing of the products.

A different solution is proposed in DE 10 2006 048 251 A1, wherein the conveyor belts or conveyor ribbons are guided along both lateral borders in a precisely fitting guide channel. The purpose of this measure is to prevent small particles of the transported materials from falling into the space below the belt.

Another solution is disclosed in EP 1 2821 941 A1, wherein a conveyor device for weighing applications is described. An endless belt, which is looped around rollers, is designed with a greater width than the length of the rollers. In the laterally overhanging border areas along both sides, the belt has ledges protruding downward, i.e. towards the inside of the closed loop. These protruding border ledges are in contact with the two opposite-facing end surfaces of the rollers. In addition, there are side plates positioned next to the opposite-facing end surfaces of the rollers, which together with further plates that are arranged below the conveyor belt are forming a kind of conveyor bed to support the conveyor belt. The outside plates have setbacks along their edges, which are likewise engaged by the protruding border ledges of the conveyor belt. Thus, the conveyor belt has a guiding constraint which prevents lateral fluctuations in the movement of the belt.

The invention has the objective to make a lasting improvement—without the use of a guiding constraint—in the breakdown vulnerability of a conveyor, specifically a belt conveyor, which is caused by pulverous or fine-grained material leaking out of the containers being transported, in order to prevent downtime of the entire system.

SUMMARY

This task is solved by a belt conveyor with a conveyor bed on which belt rollers are arranged, respectively, at both the leading end and the trailing end relative to the transport direction and wherein in the transverse direction the conveyor bed is delimited by edges. The conveyor includes a belt which is arranged to be movable over the conveyor bed and around the rollers and which is delimited along both sides, i.e. transverse to the direction of transport, by outside borders. The belt is arranged and pulled tight over the conveyor bed and the belt rollers in such a way that a sealing effect is achieved between the outside borders of the belt and the conveyor bed.

This means that the outside borders of the belt and the conveyor bed are arranged in seal-tight contact with each other. The sealing effect is achieved along the entire loop of the belt over the conveyor bed, on the underside as well as on the topside of the conveyor bed.

In this arrangement, the outside borders of the conveyor belt are set back from the edges of the conveyor bed by a distance equal to the maximum sweep of a lateral variation in the movement of the conveyor belt.

The term "maximum sweep" in this context means the extent of a lateral fluctuation in the movement of the conveyor belt in the direction perpendicular to the transport direction. In the case of a harmonic conveyor belt fluctuation, double the amount of the amplitude would be considered the maximum sweep.

The sealing effect is achieved in particular between the conveyor body and the outside borders of the conveyor belt on the side facing towards the conveyor body.

The conveyor belt glides on its lateral outside borders, moving in seal-tight contact over the areas along the edges of the conveyor bed and thus preventing powdery and granular material from entering between conveyor bed and the belt, from where it could be dragged along and get into the bearings of the belt conveyor or the drive mechanism where it could ultimately cause damage.

Due to the purposeful choice of the distance by which the outside borders of the conveyor belt are set back from the edges of the conveyor bed, the inverted returning section of the belt never protrudes from the conveyor bed and will therefore not present a catch surface for material falling from the conveyor bed.

Experiments have shown that in comparison to a state-of-the-art belt conveyor an enormous improvement can be achieved with the belt conveyor according to the invention in regard to its failure safety. Even in long-term tests of several weeks during which the belt conveyor according to the invention was transporting packages from which powdery or granular material was leaking, none of the lost material was detected on the underside of the belt, which means that the rotating parts were not exposed to any risk of destruction.

The topside of the conveyor bed is preferably designed as a flat surface. Furthermore, the conveyor belt is designed with a largely uniform material thickness over its entire width from one outside border to the other.

In a preferred embodiment of the belt conveyor, the belt is elastic. This has the advantage that the required belt tension already exists from the outset and does not have to be adjusted. In addition, the belt can be removed from the conveyor for cleaning by simply pulling it out after separating the connection between the roller bodies and their supports on one side of the conveyor bed.

According to a particularly advantageous embodiment, when the belt conveyor is in operating condition, the belt covers all connections between the belt rollers and their bearings. Thus, in addition to the advantage that practically no powdery or granular material can get on the inside of the conveyor belt, in particular when the latter is configured as an endless loop, all of the rotating parts are likewise protected against the entry of unwanted materials.

As the conveyor bed is designed to be free of openings or gaps accessible from the outside, the belt conveyor provides further protection against penetration by powdery or granular material.

In a preferred further developed embodiment of the belt conveyor, the drive mechanism is completely encapsulated by an enclosure. Particularly if the enclosure of the drive mechanism is designed to join the conveyor bed in a flush transition transverse to the transport direction of the drive mechanism, the protruding parts are reduced to a minimum.

According to a further inventive concept embodied in the design of the belt conveyor, the belt rollers at the leading end and the trailing end (relative to the transport direction) are of a basically cylindrical shape, but slightly crowned towards the middle. Over the length of the cylinder, the cylinder radius at the midpoint is larger by a few tenths of a millimeter to a few millimeters than at the ends of the belt rollers. This slightly crowned shape of the basically cylindrical belt rollers contributes significantly towards keeping the conveyor belt centered, and it stabilizes the belt during operation of the belt conveyor.

Another embodiment of the belt conveyor is distinguished by side panels that are arranged over the length of both sides of the conveyor bed, forming part of the latter. Widthwise, i.e. transverse to the transport direction, each panel extends to a level just below the belt, where it forms a flush joint with the rest of the conveyor bed to which it is solidly connected. The side panels also extend over the areas where the belt rollers are mounted in the conveyor bed. In order to continue the flush joints also in the area of the belt rollers, the end portions of the side panels are rounded with a radius perpendicular to the longitudinal axis of the respective belt rollers.

In a further advantageous embodiment of the belt conveyor, the side panels have a convex-rounded outside border zone along their top borders as well as along their rounded end portions covering the belt rollers and their mounting supports, wherein the convex curvature of the rounded border zone faces away from the belt conveyor and the curvature radius of the rounded border zone at least along the topside of the belt conveyor and of the side panels is directed perpendicular to the transport direction.

On the topside, the conveyor bed has an essentially flat surface.

It is advantageous, if the convex rounding of the panel border is not continued into the area of the enclosure of the belt drive, where a motor mount plate is arranged between the motor housing and the enclosure of the drive mechanism, solidly connected to, and in flush alignment with, the conveyor bed or to the side panel that forms part of the conveyor bed.

The bottom part of the profile of the side panel is of rectangular shape, which facilitates the mounting of connecting parts.

BRIEF DESCRIPTION OF THE DRAWINGS

In the following, the invention is described through examples which are schematically illustrated in the drawings, wherein

FIG. 3 represents the belt conveyor according to the invention in operational condition with the belt installed, in a view directed against the transport direction, wherein the enlarged detail 3a shows the setback d of the outside border of the belt from the edge of the conveyor bed;

DETAILED DESCRIPTION

Figure 1:
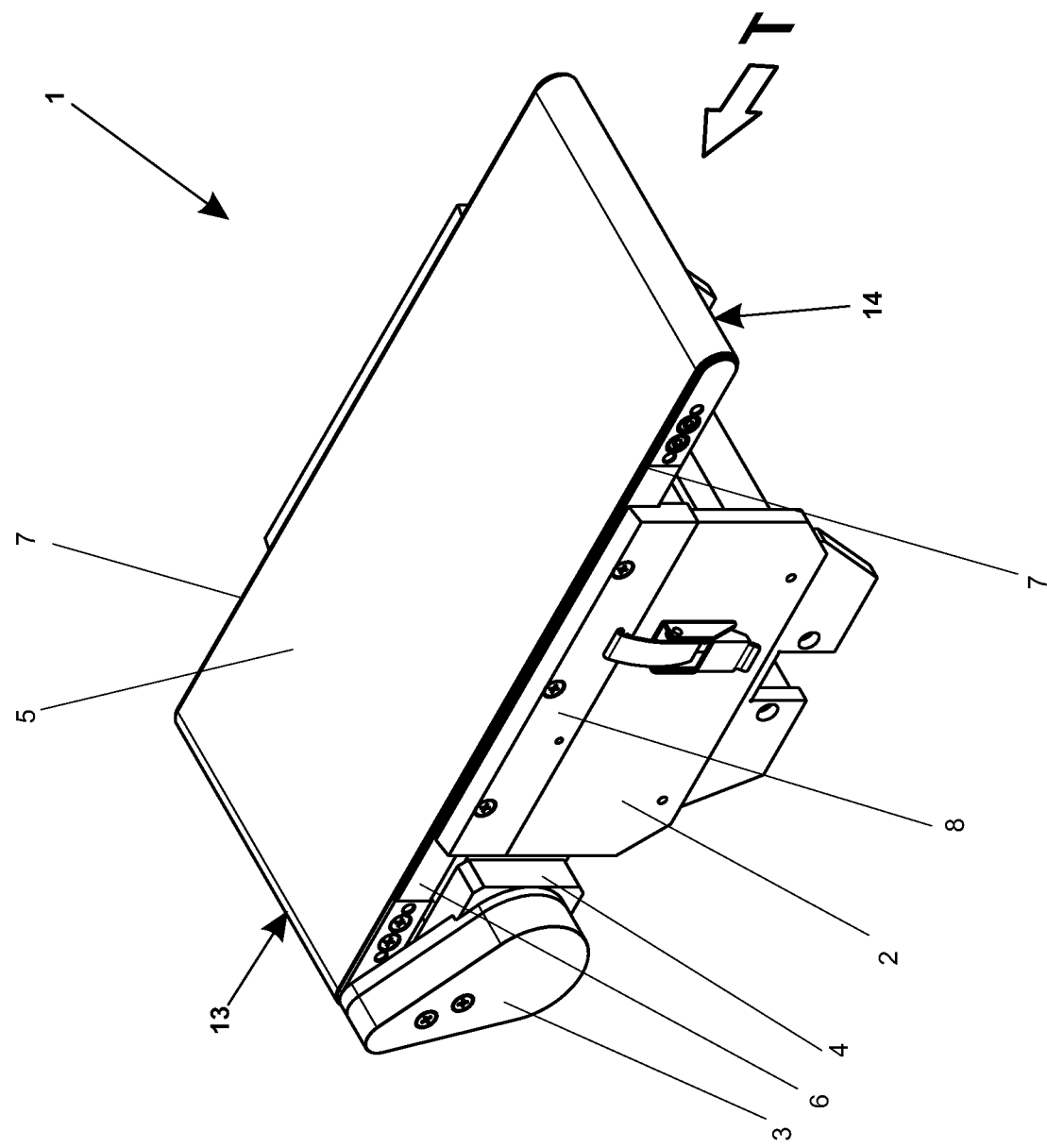
FIG. 1 represents a perspective view of a belt conveyor according to the invention.

FIG. 1 represents a belt conveyor 1 of a design that is suitable for the transportation of goods in packages that are not totally leak-proof against the escape of their pulverous or granular contents. The belt conveyor shown in FIG. 1 is of the type that includes a weighing cell for the dynamic weighing, i.e. in-motion weighing of the objects traveling on the belt. The weighing cell is arranged below the access cover 2 which has a toggle closure to allow access to the weighing cell. As the weighing cell is not a subject of the present invention, it will not be further described here. Instead of being used in combination with a weighing cell, a belt conveyor according to the invention can also be configured as an infeed conveyor or an outfeed conveyor, or a conveyor with a device for removing faulty products, or with further product inspection devices, for example for the detection of contaminants in the products, or other inspections.

The belt conveyor 1 has a drive mechanism which is completely encapsulated by an enclosure 3 and connected on one side to a motor arranged inside the housing 4 and on the other side to a roller that is located at one end of the belt conveyor, i.e. the driven roller 13. In FIG. 1 the driven roller 13, including in particular the areas of its bearings and the connection to the drive mechanism, is completely covered by the conveyor belt 5. This will be described in detail in the context of FIG. 4.

The conveyor belt 5 can be described as an elastic band which runs under tension in an endless loop over the conveyor bed 6 and the belt rollers. Accordingly, the conveyor belt 5 is configured as a band of flat material with a largely homogeneous thickness over its entire width and length. In the arrangement illustrated here, no provisions were made for a device to adjust belt tension, as the conveyor belt 5 has sufficient elasticity to allow it to be installed in, as well as removed from, the belt conveyor 1, for example for cleaning purposes.

The topside of the conveyor bed 6 is designed essentially as a flat surface.

With the use of an elastic conveyor belt 5, the required belt tension is already inherent in the design. Furthermore, the belt 5 is self-centering during operation, a property that is further supported by a slightly crowned shape of the belt rollers, i.e. the driven roller 13 and the idling roller 14. Thus, the complicated operations of a belt tension adjustment as well as a misalignment correction have been eliminated. However, it should be mentioned that a belt conveyor 1, even if devices for the adjustment of belt tension and correction of a misalignment were added to it, would still be considered to be within the scope and concept of the present invention.

The conveyor belt 5 is now arranged on the conveyor bed 6 and looped under tension over the conveyor bed 6 and around the belt rollers, specifically the driven roller 13 and the idling roller 14, in such a way that a sealing effect is achieved between the outside borders 7 of the conveyor belt 5 and the conveyor bed 6. This means that during operation the moving conveyor belt 5 is gliding over the conveyor bed 6 and that its outside borders 7, in particular the outside border areas on the side facing towards the conveyor bed 6, are always in contact with the conveyor bed 6. As a result, powder or fine-grained material is prevented from entering between the conveyor bed 6 and the conveyor belt 5 where it could possibly be ground up and/or adhere to the inside of the conveyor belt 5, i.e. to the side of the belt that always faces away from the objects being transported, so that it would be carried along and could possibly enter into the drive mechanism or into the bearings of the belt rollers.

In the operation of a belt conveyor, it is inevitable that the belt is subject to slight but still measurable sideways deviations, so-called lateral fluctuations of the belt. To prevent a condition where the conveyor belt 5 on its return run, i.e. looping back below the conveyor bed 6, would protrude even by a slight amount beyond the edge of the conveyor bed 6, so that powder or granular material lying on the conveyor bed 6 could fall on the temporarily protruding portion of the conveyor belt 6, i.e. on the inside of the belt 6, the inventive design specifies for the outside border 7 to be set back from the edge 16 of the conveyor bed 6 by a distance d. This distance d is equal to at least twice the amplitude of a lateral fluctuation of the conveyor belt 5 and thus to the maximum sweep of the fluctuation (see also FIG. 3a).

Lateral fluctuations of a conveyor belt, which could also be referred to as a lateral beat, are caused by manufacturing tolerances of the belt and amount to a few millimeters.

As can further be seen in FIG. 1, neither the conveyor bed 6 nor other parts of the belt conveyor 1 have any gaps or openings through which powder or granular material could enter.

Figure 2:
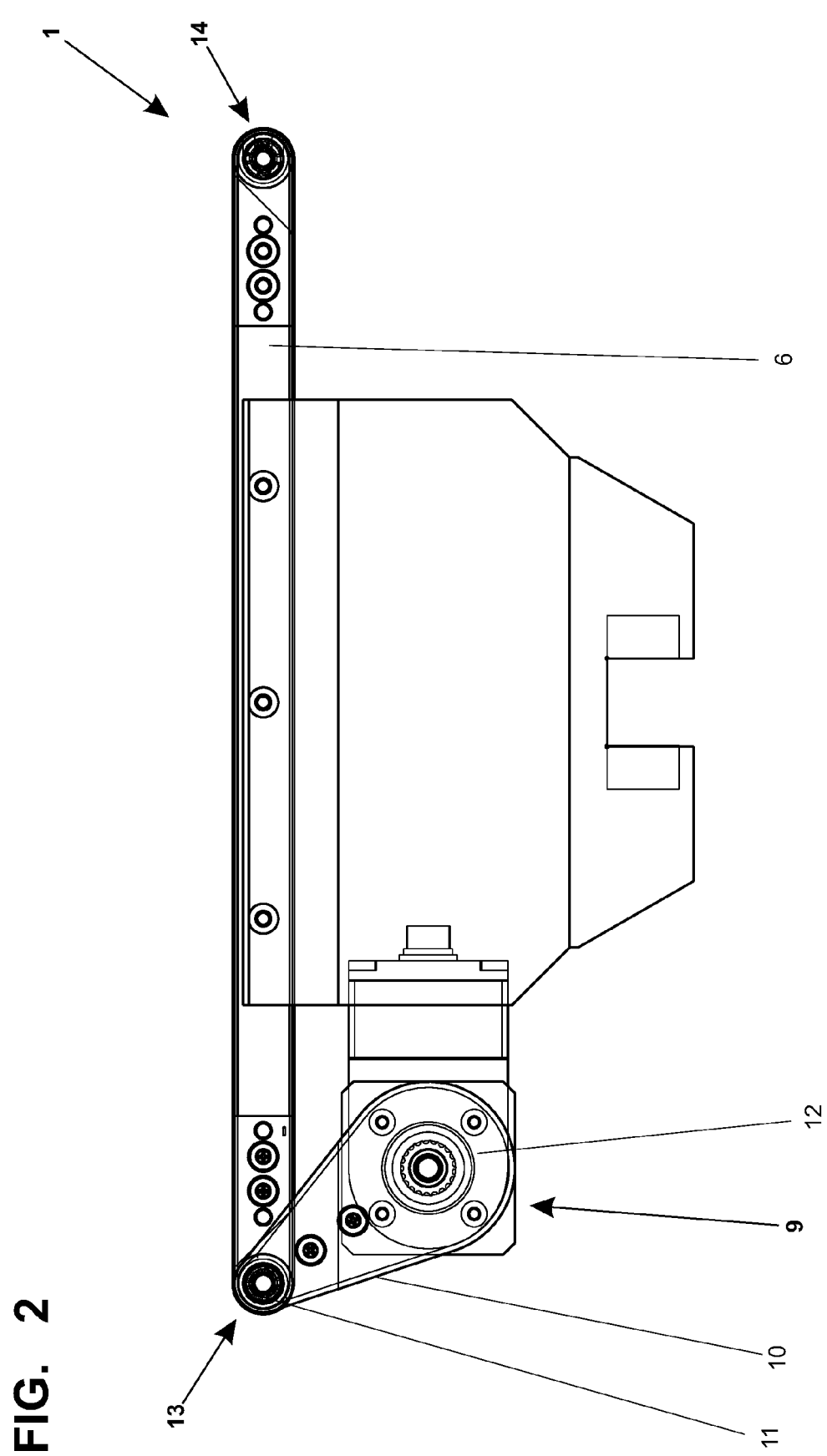
FIG. 2 represents a side view of the belt conveyor according to the invention.

FIG. 2 shows the same belt conveyor 1 in a view from the side. The enclosure 3 of the drive mechanism 9 has been removed, so that the drive 9 is exposed to view. The driven belt roller 13 is connected to the motor through a belt drive with two drive pulleys 11, 12 and a drive belt 10. The pulley 11 is often referred to as the driven pulley. The motor is arranged below the conveyor bed 6. The belt drive can be of the type with a toothed belt, a V-belt, and the like. If powder or granular material reaches the drive mechanism 9, in this case for example a toothed belt drive, it will have a tendency to settle especially into the recesses of the drive pulleys 11, 12, which are in this case toothed pulleys, where the material becomes compacted. This leads to a buildup of material in the recesses and as a consequence to an increase of the loop radii of the toothed belt relative to the pulleys, which increases the tension of the toothed belt and leads to stretching and ultimately to a rupture of the belt. This type of failure is prevented from occurring in the belt conveyor 1 according to the invention.

At the opposite end of the belt conveyor 1, i.e. relative to the drive mechanism 9 at the far end of the conveyor path, FIG. 2 shows the idling belt roller 14.

FIG. 3 shows the belt conveyor 1 according to the invention, ready for operation with the belt 5 installed, in a view oriented against the transport direction T. At the right side of FIG. 3, next to the housing 4 of the motor, the enclosure 3 of the dive mechanism can be seen. Further, on the left side of FIG. 3, the access cover 2 with toggle closure is shown, which allows access to the space below the conveyor belt 5, for example to a weighing cell that is arranged in the interior of the belt conveyor 1 (not shown in the drawing).

As can be seen in FIG. 3a, which represents the enlarged detail that is encircled in FIG. 3, the outside border 7 of the belt conveyor 5 is set back by a certain distance d from the edge 16 of the conveyor bed 6, so that a part of the conveyor bed 6 remains visible. The distance d of the outside border 7 of the conveyor belt 5 from the edge 16 of the conveyor bed 6 is selected large enough that lateral sway movements of the conveyor belt 5—also referred to as belt fluctuations—cannot lead to a condition where the conveyor belt 5 would protrude beyond the conveyor bed 6. With this design measure, i.e. by selecting the distance d to be larger than or equal to the maximum sweep of a belt fluctuation or lateral fluctuation of the conveyor belt, any possibility for the belt 5 to protrude beyond the conveyor bed 6 is prevented. This avoids the risk that powdery or granular material could fall from the conveyor belt 5 onto the inside of the conveyor belt 5 if its returning part were to protrude from the underside of the conveyor bed 6. Furthermore, the outside border 7 of the conveyor belt 5, specifically the side facing towards the conveyor body 6, is in gliding contact with the conveyor body 6 and thereby forms a seal with the latter. Accordingly, no material can penetrate between the conveyor body 6 and the conveyor belt 5.

As is likewise evident in FIG. 3, the conveyor belt 5 completely covers the driven belt roller 13, as the width of the conveyor belt 5 is selected larger than the length of the driven belt roller 13. Furthermore, any other rotating parts of the belt conveyor 1 are also covered or are placed inside an enclosure.

Figure 4:
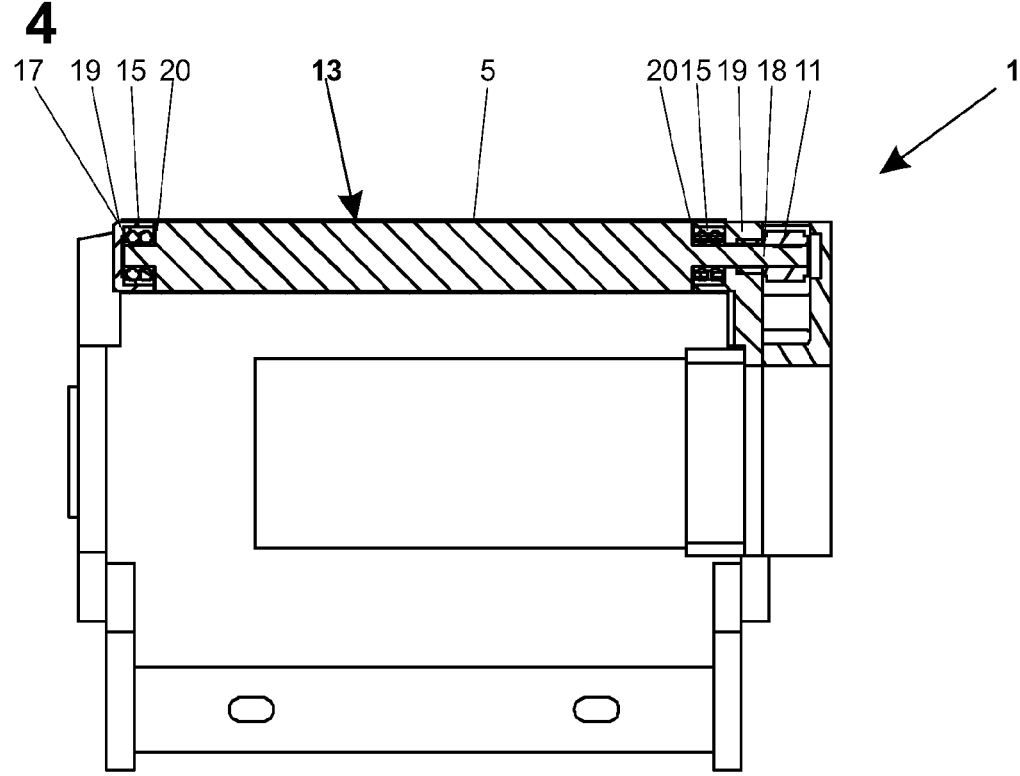
FIG. 4 shows a sectional view of the belt conveyor according to the invention seen against the transport direction, illustrating the arrangement of the bearings of the driven roller.

FIG. 4 shows a sectional view of the belt conveyor 1 according to the invention seen against the transport direction T, with the belt 5 installed. The driven belt roller 13 has a pin 17, 18 at each end. The pins 17, 18 are rotatably supported by means of the driven roller bearings 15 which are mounted in roller supports 19 in the conveyor bed 6. The pin 18 is extended in comparison to the pin 17 and is solidly connected to the driven pulley 11. In the operating state the gap 20, which necessarily exists between the driven roller 13 and the roller support 19, is covered by the conveyor belt 5.

Figure 5:
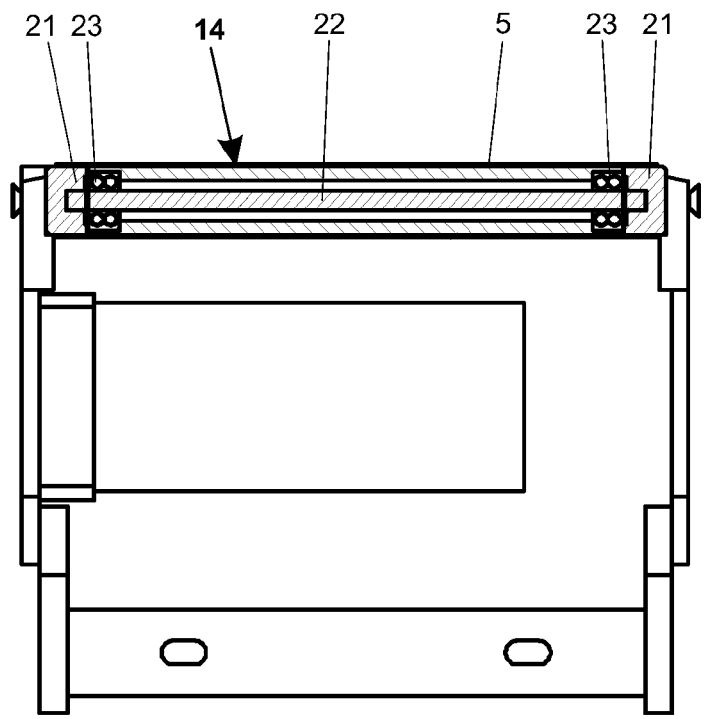
FIG. 5 shows a sectional view of the belt conveyor according to the invention seen in the transport direction, illustrating the arrangement of the bearings of the idling roller.

As can be clearly seen in FIG. 4 as well as in the next-following FIG. 5, the conveyor belt 5 is designed with a largely constant material thickness over its entire width including the outside borders 7, i.e. with a homogeneous thickness. The belt 5 can be taken off for cleaning by separating the driven roller 13 from the roller support 19 on one side in the area of the driven roller bearing 15, whereupon the elastic belt 5 can simply be pulled off.

FIG. 5 shows a sectional view of the belt conveyor 1 according to the invention seen in the transport direction T, with the belt 5 installed. The idling roller 14 is supported on both sides by roller supports 21 which are connected to the conveyor bed 6. The roller supports 21 are holding the axle 22 which extends through the entire length of the roller body. The idling roller 14 is rotatably supported on the axle 22 by means of the idling roller bearings 23. As in the case of the driven roller 13, the width of the conveyor belt 5 is again selected larger than the length of the idling roller 14.

Figure 6:
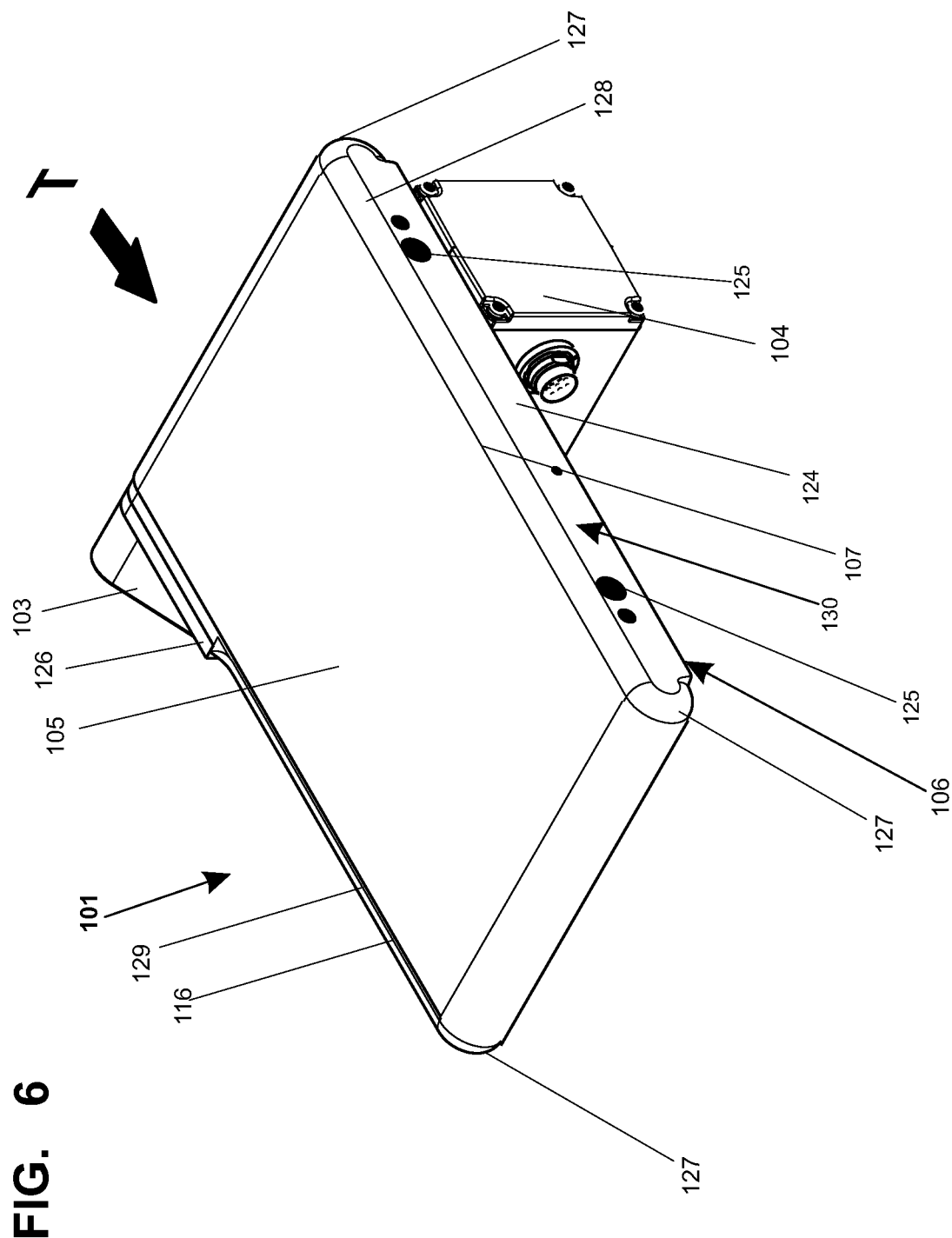
FIG. 6 represents a perspective view of the belt conveyor according to the invention in a further, alternative embodiment.

FIG. 6 shows a further embodiment of the belt conveyor 101. The two lengthwise sidewalls 130 of the conveyor bed, which is essentially flat on top, are covered by side panels 124. Widthwise, i.e. transverse to the transport direction, each panel 124 extends to a level just below the conveyor belt 105, where it forms a flush joint with the rest of the conveyor bed 106, to which it is solidly connected by screws 125. Each of the panels 124 extends over the entire lengthwise sidewall 130 of the conveyor bed 106 and forms a part of the conveyor bed 106. Thus, the side panels 124 also extend over the areas where the belt rollers are mounted in the conveyor bed 106. In order to continue the flush joints also in the area of the belt rollers, the panel contours are rounded at the panel ends 127 with a radius perpendicular to the longitudinal axis of the respective belt rollers (covered up and not exposed to view in FIG. 6).

At the top as well as in the areas of the of the rounded ends covering the belt rollers and their supports, the side panels have rounded outside border zones, wherein the convex curvature 128 of the rounded border zone faces away from the belt conveyor 101 and wherein the curvature radius at least along the topside of the belt conveyor 101 is perpendicular to the transport direction T. The purpose of this convex-rounded border zone 128 is on the one hand to improve the esthetic appearance of the belt conveyor 101 and on the other hand to deflect dirt in the sense that powdery or fine-grained materials falling off the belt 105 are directed away from the belt conveyor. At the top of the side panel 124, the convex-rounded border 128 continues into a flat zone 129 which, as mentioned above, is connected through a flush joint with the rest of the conveyor bed 106. The conveyor belt 105 is arranged and pulled tight over the conveyor bed 106 and the rollers in such a way that a sealing effect is achieved between the outside borders 107 of the belt 105 and the conveyor bed 106, especially between the areas at the outside borders 107 of the conveyor belt 105 on the side facing towards the conveyor bed 106 and the flat zone 129 of the side panel 124 of the conveyor bed 106.

The distance by which the outside border 107 of the conveyor belt 106 is set back from the transition between the convex-rounded zone 128 and the flat zone 129 corresponds to the area illustrated in FIG. 3a for which the rule applies that the outside borders of the conveyor belt are set back from the respective edges of the conveyor bed by a distance d that is at least equal to a maximum lateral fluctuation of the conveyor belt.

Accordingly, for the purpose of determining the setback distance d of the belt border 107, the edge of the conveyor bed in this embodiment needs to be interpreted as the beginning of the convex-rounded zone 128. The distance d in this case represents the distance of the outside border 107 of the conveyor belt 105 from the beginning of the convex-rounded zone 128.

The bottom part of the profile of the side panel is of rectangular shape, which facilitates the mounting of connecting parts.

The convex-rounded zone 128 is not continued into the area of the enclosure 103 of the drive mechanism, where a motor mount plate 126 is arranged between the motor housing 104 and the enclosure 103 of the drive mechanism, solidly connected to, and in flush alignment with, the conveyor bed 106 and the side panel 124 that forms part of the conveyor bed 106. As a result, the motor housing 104 sealed tightly, and the risk that powdery or fine-grained substances falling off the conveyor belt 105 could penetrate inside the enclosure 103 of the drive mechanism is avoided.

The invention has been illustrated and described through the embodiments represented in the drawings. It is considered self-evident that there are further embodiments not described herein which nevertheless conform to the teachings of the invention.

List of Reference Symbols 1, 101 belt conveyor
2 access cover
3, 103 enclosure of drive mechanism
4, 104 housing of motor
5, 105 belt, conveyor belt
6, 106 conveyor bed
7, 107 outside border of conveyor belt
  8 cover panel
  9 drive mechanism, belt drive
  10 drive belt
  11 driven pulley
  12 drive pulley
  13 driven roller
  14 idling roller
  15 bearing of driven roller
16, 116 edge of conveyor bed
  17 pin of driven roller
  18 pin of driven roller
  19 roller support in conveyor bed
  20 Gap
  21 roller support
  22 Axle
  23 bearing of idling roller
  124 side panel 125 Screws
126 motor mount plate
127 rounded end portion of side panel
128 convex-rounded border zone
129 flat zone at top of side panel
130 lengthwise side wall of conveyor bed
　　d distance of the outside border of the belt from the edge of the conveyor bed
　　T transport direction

The invention claimed is:

1. A belt conveyor, comprising:
 a conveyor bed, having a leading end and a trailing end relative to a transport direction thereof, the conveyor bed having a topside and an underside and having edges that delimit a direction transverse to the transport direction;
 a pair of belt rollers, one of which is arranged at each of the respective ends of the conveyor bed, at least one of the belt rollers of a basically cylindrical shape, and slightly crowned towards the middle; and
 a conveyor belt, having sides that are delimited by outside borders, the conveyor belt pulled tight over the conveyor bed and around the pair of belt rollers, the shape of which pulls the outside borders into a sealing relationship with the conveyor bed along an entire loop of the conveyor belt, on the underside as well as the topside of the conveyor bed.

2. The belt conveyor according to claim 1, wherein the conveyor belt has a uniform material thickness over its entire width, out to each border.

3. The belt conveyor according to claim 2, wherein the sealing effect is achieved along the outside borders of the conveyor belt between the conveyor bed and the side of the conveyor belt that faces towards the conveyor bed.

4. The belt conveyor according to claim 1, wherein the conveyor belt is elastic.

5. The belt conveyor according to claim 4, further comprising bearings that connect the belt rollers to the conveyor bed, the conveyor belt being arranged in its operational state to cover all connections between the belt rollers and their bearings.

6. The belt conveyor according to claim 5, wherein the conveyor bed is free of openings or gaps accessible from the outside.

7. The belt conveyor according to claim 6, further comprising a drive mechanism that is completely encapsulated by an enclosure.

8. The belt conveyor according to claim 7, wherein the enclosure joins the conveyor bed in a flush transition transverse to the transport direction.

9. The belt conveyor according to claim 1, wherein the belt conveyor comprises at least one of: an infeed conveyor, an outfeed conveyor, a device for the dynamic weighing of products and a device for the inspection of products to detect contaminants.

10. The belt conveyor according to claim 1, further comprising:
 a pair of sidewalls, one sidewall extending along the entire length of a corresponding one of the edges of the conveyor bed, forming a part thereof; and
 a pair of side panels, each side panel associated with a corresponding one of the sidewalls, each side panel having a width that is transverse to the transport direction and extending to a level just below the conveyor belt, and each side panel forming a flush joint with, and being solidly connected to, the conveyor bed.

11. The belt conveyor according to claim 10, wherein: each side panel extends over the areas where the belt rollers are mounted in the conveyor bed and each of the side panels has rounded end portions with a radius perpendicular to the longitudinal axis of the corresponding belt roller, to maintain the flush joint with the conveyor bed.

12. The belt conveyor according to claim 11, wherein: each side panel comprises a convex-rounded outside border zone along a top border of the side panel as well as along the rounded end portions, the convex curvature of each rounded outside border zone facing away from the belt conveyor and the curvature radius of the rounded outside border zone being directed perpendicular to the transport direction, at least along the topside of the belt conveyor and of the side panels.

13. The belt conveyor according to claim 12, wherein:
 the drive mechanism further comprises a motor housing and a motor mount plate which is arranged between the motor housing and the enclosure and is solidly connected to, and in flush alignment with, either the conveyor bed or the side panel that forms part of the conveyor bed, such that the rounded outside border zone is not continued into the area of the enclosure.

14. The belt conveyor according to claim 11, wherein each side panel has a rectangular profile at an underside thereof, which facilitates the mounting of connecting parts.

* * * * *